United States Patent
Hendrickson

(10) Patent No.: US 6,510,215 B1
(45) Date of Patent: Jan. 21, 2003

(54) CALLER ID DATA-REPORTING MECHANISM FOR ELECTRONIC DEVICES AND ASSOCIATED METHODS

(75) Inventor: Alan F. Hendrickson, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 28 days.

(21) Appl. No.: 09/617,757

(22) Filed: Jul. 17, 2000

(51) Int. Cl.⁷ .................................................. H04M 1/56
(52) U.S. Cl. ............................. 379/142.15; 379/142.14
(58) Field of Search ...................... 379/142.01, 142.07, 379/142.12, 142.14, 142.15, 142.16, 142.18, 93.15, 93.17, 93.23

(56) References Cited

U.S. PATENT DOCUMENTS

| | | | |
|---|---|---|---|
| 5,377,260 A | * 12/1994 | Long | 379/142.01 |
| 5,870,046 A | 2/1999 | Scott et al. | |
| 6,052,442 A | * 4/2000 | Cooper et al. | 379/88.19 |
| 6,111,939 A | * 8/2000 | Brabanec | 379/142.01 |
| 6,160,885 A | 12/2000 | Scott et al. | |
| 6,205,219 B1 | * 3/2001 | Hollenbach et al. | 379/413 |
| 6,298,133 B1 | 10/2001 | Hein et al. | |
| 6,345,088 B1 | * 2/2002 | Gu et al. | 379/93.35 |
| 6,385,235 B1 | 5/2002 | Scott et al. | |

OTHER PUBLICATIONS

Intel Corporation, "Audio Codec '97—Revision 2.1", May 22, 1998.

* cited by examiner

*Primary Examiner*—Rexford Barnie
(74) *Attorney, Agent, or Firm*—O'Keefe, Egan & Peterman, LLP

(57) ABSTRACT

Caller ID (CID) data-reporting circuitry operates in conjunction with direct-access arrangement (DAA) circuitry or other circuitry that operates within the operational requirements of the Audio Codec '97 (AC-97) Component Specification. The CID data-reporting circuitry provides for the transfer of a data word from the DAA circuitry to a host computer or controller that operates within the AC-97 operational specifications. The CID data-reporting circuitry transfers the CID data in an asynchronous manner, i.e., at non-pre-determined intervals. Software running on the host computer or the controller may thus examine each data word or group of data words and take appropriate action, for example, process the data further or terminate the data transfer. A command interpreter begins the data transfer by initializing an address pointer used to facilitate retrieving the data from a CID random-access memory (RAM) and to make the data available to the host computer or controller through an output register.

31 Claims, 3 Drawing Sheets

CALLER ID DATA-REPORTING MECHANISM FOR ELECTRONIC DEVICES AND ASSOCIATED METHODS

TECHNICAL FIELD OF THE INVENTION

This invention relates to reporting Caller ID (CID) data to electronic devices and, more particularly, to reporting CID data to controllers and computer systems meeting operational features of the Audio Codec '97 Component Specifications.

BACKGROUND

To provide a standard interface for computer system audio applications, Intel Corporation has sponsored the Audio Codec '97 (AC-97) Component Specification. Note that, as used herein, AC-97 operational specifications include the current AC-97 operational specifications and any revisions or updates to those specifications, as well as any follow-on specifications that incorporate features of the current AC-97 operational specifications. The Audio CODEC '97 Component Specification (AC97), revision 2.1 (May 22, 1998) is hereby incorporated by reference in its entirety. The AC-97 specifications enable a controller to communicate with a variety of devices. Some of these devices may use or operate on Caller ID (CID) data provided by the telephone company. CID data typically provides infomiation about the identity of a calling party, the telephone number of the calling party, the time of the call, etc.

The AC-97 specifications provide a means of reporting the CID data, typically up to 256 characters (1 byte each) over a serial link. To do so, a software program must invoke a channel buffer of an AC-97 host computer. Using the channel buffer in this manner, however, has several disadvantages. First, the software program has no way of determining the size of the buffer before reporting of the CID data commences. Thus, the software program must allocate the largest size possible. Second, the reporting of the CID data can take a long time. Because the software program has no way of knowing the contents of the CID data, it must allow for the transmission of the entire data set, even though it may need only the first few bytes of data. Third, the data have an indeterminate address within the buffer because of the timing of their arrival. The unknown timing of the arrival of the first word of data from the buffer after the allocation of buffer space and subsequent enabling of data storage in the buffer results in indeterminate address for the first data word. Put another way, because the buffer receives the data words sequentially, the data block as a whole has an indeterminate offset address within the buffer. As a result, the software program must perform additional procedures to identify the offset address within the buffer. Typically, the software program must search the entire data block for specific words or groups of words, for example special codes identifying data headers. Poor reception resulting in bit errors in the received data, however, may cause the search to produce erroneous results that would require further processing to avoid reporting incorrect CID data to the end user. The AC-97 specifications fail to provide any mechanisms or features to combat these problems.

SUMMARY OF THE INVENTION

This invention provides Caller ID (CID) data-reporting apparatus and associated methods for solving the disadvantages of receiving CID data through AC-97 channel buffers. CID data-reporting circuitry according to the invention reports Caller ID data by using the AC-97 status and control channels and without using the AC-97 audio channels.

In one embodiment, the invention constitutes direct-access-arrangement (DAA) circuitry including interface circuitry configured to operate within the AC-97 operational specifications. The interface circuitry receives input data and provides output data. The direct-access-arrangement circuitry also includes Caller ID data circuitry coupled to the interface circuitry. The Caller ID data-reporting circuitry provides Caller ID data to the interface circuitry asynchronously. More specifically, the Caller ID data-reporting circuitry provides the Caller ID data in one-word increments at non-pre-determined intervals.

In another embodiment, the invention constitutes an integrated circuit device configured to operate within the AC-97 operational specifications. The integrated circuit device includes interface circuitry configured to operate within the AC-97 operational specifications. The interface circuitry receives input data and provides output data. The integrated circuit device also includes Caller ID data circuitry coupled to the interface circuitry. The Caller ID data-reporting circuitry provides Caller ID data to the interface circuitry asynchronously in one-word increments. More specifically, the Caller ID data-reporting circuitry provides the Caller ID data at non-pre-determined intervals.

In yet another embodiment, the invention constitutes a computer system that includes direct-access-arrangement circuitry for coupling the computer system to data lines. The computer system includes a processor configured to process data and to decode and process instructions; a controller, coupled to the processor, and configured to operate within the AC-97 operational specifications; direct-access-arrangement circuitry, coupled to the controller, and configured to operate within the AC-97 operational specifications; and Caller ID data-reporting circuitry coupled to the direct-access-arrangement circuitry. The Caller ID data-reporting circuitry provides Caller ID data to the direct-access-arrangement circuitry asynchronously in one-word increments. The direct-access-arrangement circuitry communicates with the controller. More specifically, the Caller ID data-reporting circuitry provides the Caller ID data at non-pre-determined intervals.

In an alternative embodiment, the invention constitutes a computer system that includes circuitry configured to operate within the AC-97 operational specifications. The computer system includes a controller configured to operate within the AC-97 operational specifications; an integrated circuit device coupled to the controller, and Caller ID data-reporting circuitry within the integrated circuit device. The integrated circuit device operates within the AC-97 operational specifications and communicates with the controller. The Caller ID data-reporting circuitry receives Caller ID data and provides Caller ID data to the controller asynchronously. More specifically, the Caller ID data-reporting circuitry provides the Caller ID data in one-word increments at non-pre-determined intervals.

In another aspect, the invention constitutes a method for reporting Caller ID data in a computer system. The method includes providing a host processor configured to process data and to decode and process instructions, and providing direct-access-arrangement circuitry configured to operate within the AC-97 operational specifications. The direct-access-arrangement circuitry includes Caller ID data-reporting circuitry that provides Caller ID data asynchronously in one-word increments. The method further includes receiving Caller ID data in the Caller ID data-reporting circuitry and providing the Caller ID data to the host processor. More specifically, the Caller ID data-reporting circuitry provides the Caller ID data to the device at non-pre-determined intervals.

In another embodiment, the invention constitutes a method for reporting Caller ID data. The method includes providing direct-access-arrangement circuitry that operates within the AC-97 operational specifications. The direct-access-arrangement circuitry includes Caller ID data-reporting circuitry that receives Caller ID and provides Caller ID asynchronously. The method further includes receiving Caller ID data in the Caller ID data-reporting circuitry and providing the Caller ID data to a device. The device may comprise a host processor or a controller. More specifically, the Caller ID data-reporting circuitry provides the Caller ID data in one-word increments at non-pre-determined intervals.

DESCRIPTION OF THE DRAWINGS

The appended drawings illustrate only exemplary embodiments of the invention and therefore do not limit its scope, because the inventive concepts lend themselves to other equally effective embodiments.

DETAILED DESCRIPTION OF THE INVENTION

Figure 1:
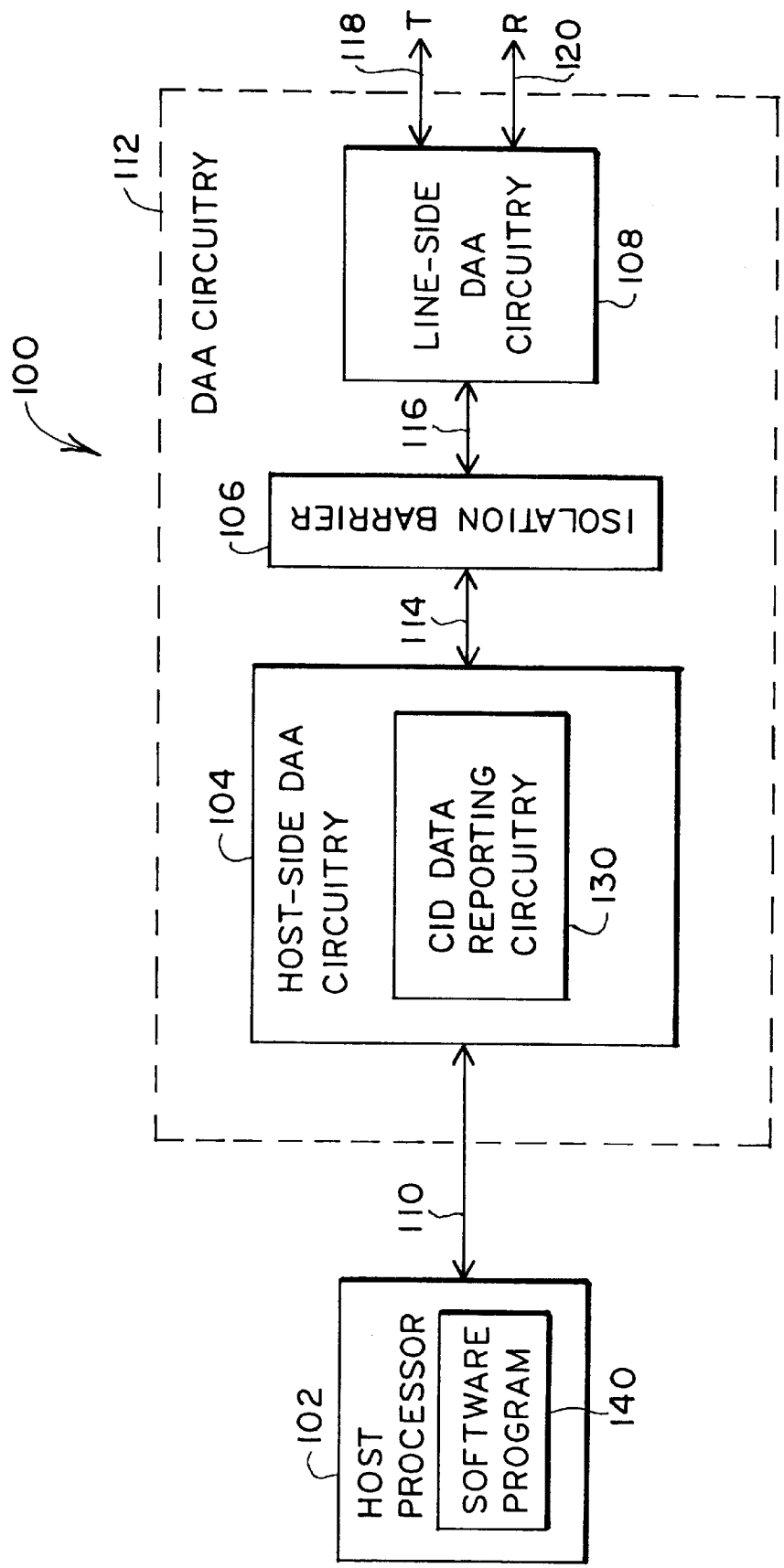
FIG. 1 illustrates a block diagram of a line-interface controller that includes line-side direct-access-arrangement (DAA) circuitry and host-side direct-access-arrangement circuitry that includes Caller ID (CID) data-reporting circuitry according to the invention.

This invention contemplates direct-access arrangement (DAA) circuitry that includes Caller ID (CID) data-reporting circuitry for providing CID data to a host or controller. In particular, the invention relates to providing CID data to a host computer or controller that operates within the AC-97 operational requirements (i.e., is AC-97 compliant). By incorporating the CID data-reporting circuitry, DAA circuitry according to this invention provides a solution to the problems of inefficient use of hardware and software resources associated with invoking AC-97 channel buffers to locate and extract CID data.

A software program residing on an AC-97 host computer or controller operates in conjunction with the CID data-reporting circuitry according to the invention. The software program sends commands to the CID data-reporting circuitry. In response, the CID data-reporting circuitry provides CID data to the AC-97 controller or host computer sequentially over a link between the DAA circuitry and the AC-97 controller or host computer, known as the AC link. The CID data-reporting circuitry according to the invention provides the CID data to the AC-97 controller or host computer over the AC-link one word or byte at a time.

The data-reporting cycle begins with the initialization of an address pointer. The address pointer points to the location of the CID data in a buffer or memory. Data-read cycles follow the initialization of the address pointer. Each read cycle returns the data word at the location in the buffer corresponding to the current value of the address pointer. The read cycle also post-increments the address pointer, preparing it for the next read cycle. Repeating this cycle allows the reporting of CID data one word at a time.

The CID data-reporting mechanism according to the invention accomplishes the desired CID data reporting task without using the AC-97 audio channels. A CID data-reporting mechanism that uses the AC-97 audio channels typically uses the AC-97 audio time-slots 5 or 10. That manner of operation places restrictions on the software supervising the CID data-reporting operation by requiring it to receive all of the data words over the audio channel of the AC-97. The mechanism for reporting CID data using AC-97 audio channels reports the data at pre-determined intervals and at a constant transfer rate (although the time period between the transfers may not be constant). Put another way, the mechanism for reporting CID data over the AC-97 audio channel delivers the data isochronously.

In contrast, the CED data-reporting mechanism according to this invention accesses the CID data through the AC-97 status and control channel, i.e., time-slots 1 and 2 of the AC-97 data frame. The CID data-reporting mechanism according to the invention reports the CID data in non-pre-determined intervals in response to requests of an external device. Thus, unlike a mechanism using the AC-97 audio channel, the CID data-reporting mechanism according to this invention reports the CID data asynchronously.

The CID data-reporting mechanism according to the invention has several advantages. First, by writing the initial value of the address pointer to access the buffer or memory, the data-reporting mechanism avoids a subsequent need for searching through the data to locate the data word at the beginning of a block of CID data. Thus, the initialization of the address pointer overcomes one disadvantage of invoking the AC-97 channel buffers, mentioned above.

Second, the CID data-reporting circuitry according to the invention enables the software program to allocate AC-97 buffer space efficiently and dynamically. The software program can search for the data header word (i.e., a word or collection of words marking the beginning of a block of CID data) as it receives each word. Thus, the software need not search the entire buffer space to locate the header word or words. Because the CID data-reporting circuitry reports CID data to the AC-97 host processor or controller one word at a time, the software program can allocate only the necessary amount of buffer space, rather than allocating the maximum amount. The software program may do so by examining a header word, for example, a word indicating the size of the CID data block, or a group of words, and allocate buffer space accordingly.

Third, CID data-reporting circuitry according to the invention allows a software program running on an AC-97-compliant host processor or controller to terminate the data-reporting cycle at any time. Specifically, the software program can examine the CID data word by word, as it receives each word from the CID data-reporting circuitry. In this manner, the software program can efficiently and quickly search for a data word or group of data words marking the end of the desired CID data block. Upon reaching the end of the CID data block, the software program can terminate the process without any further need to examine or process the contents of the buffer to locate the end of the data block. Moreover, the software program can take immediate steps without awaiting the end of the data transfer. As it receives the CID data word by word, the software program can examine each data word after receiving it and take intermediate processing or computation steps based on the value of the received word alone or in conjunction with the values of the words received previously. Finally, the software program can examine each data word or a group of data words to determine its validity. Upon detection of an invalid data word, the software program can take remedial measures or abort further reception of the data, thus saving processing time.

FIG. 1 shows a block diagram for an embodiment 100 that includes CID data-reporting circuitry 130 according to the invention. A host processor 102 couples to direct-access-arrangement (DAA) circuitry 112 through a communication interface 110. The DAA circuitry 112 allows the host processor 102 to communicate with tip (T) 118 and ring (R) 120 of a telephone line. The DAA circuitry 112 includes host-side DAA circuitry 104, an isolation barrier 106, line-side DAA circuitry 108, and isolation communication interfaces 114 and 116. The host-side DAA circuitry 104 and line-side DAA circuitry 108 may each reside within a single integrated circuit. An exemplary description of such DAA circuitry appears in U.S. Pat. No. 5,870,046, assigned to Silicon Laboratories, Inc. U.S. Pat. No. 5,870,046, as well as copending application Ser. No. 09/035,175, entitled "Direct Digital Access Arrangement Circuitry and Method for Connecting Phone Lines," also assigned to Silicon Laboratories, Inc., are hereby each incorporated by reference in their entireties. Alternatively, the host-side DAA circuitry 104 and the line-side DAA circuitry 108 may reside within a single integrated circuit.

In addition, each of the following U.S. patent applications, which are related in subject matter to the current application and are filed concurrently herewith, is hereby incorporated by reference in its entirety: Ser. No. 09/617,465, entitled "TELEPHONE RING-VALIDATION AND WAKE-ON-RING CIRCUITRY AND ASSOCIATED METHODS" by Alan F. Hendrickson; Ser. No. 09/617,079, entitled "TELEPHONE HANG-UP TIMEOUT CIRCUITRY AND DATA TIMEOUT CIRCUITRY FOR ELECTRONIC DEVICES AND ASSOCIATED METHODS" by Alan F. Hendrickson; Ser. No. 09/617,405, entitled "DATA-SECURITY CIRCUITRY FOR ELECTRONIC DEVICES AND ASSOCIATED METHODS" by Alan F. Hendrickson; and Ser. No. 09/617,350, entitled "PROGRAMMABLE VENDOR IDENTIFICATION CIRCUITRY AND ASSOCIATED METHOD" by Alan F. Hendrickson and Robert C. Wagner.

The host-side DAA circuitry 104 incorporating CID data-reporting circuitry 130 according to the invention can provide CID data to the host processor 102 through the communication interface 110, one word at a time, as described above. The DAA circuitry 112 includes at least one CID data-reporting circuitry 130. A software program 140 on the host processor processes the CID data received through the communication interface 110. The software program 140 may take various actions depending on the value of each received data word or depending on the values of a group of received data words, as described above. These actions may include processing steps or taking remedial measures if the software program receives invalid or erroneous data. The host-side DAA circuitry 104 may take the form of an integrated-circuit. In such a configuration, the CID data-reporting circuitry 130 may reside within the integrated-circuit containing the host-side DAA circuitry 104. Alternatively, the CID data-reporting circuitry 130 may reside outside the integrated-circuit that contains the host-side DAA circuitry 104 and communicate with it through one or more signal lines. The CID data-reporting circuitry 130 according to this invention accesses the CID data through the AC-97 status and control channel, i.e., time-slots 1 and 2 of the AC-97 data frame. The CID data-reporting circuitry 130 reports the CID data asynchronously, i.e., in non-pre-determined intervals. Thus, the CID data-reporting circuitry 130 places no real-time constraints on the software program 140.

Figure 2:
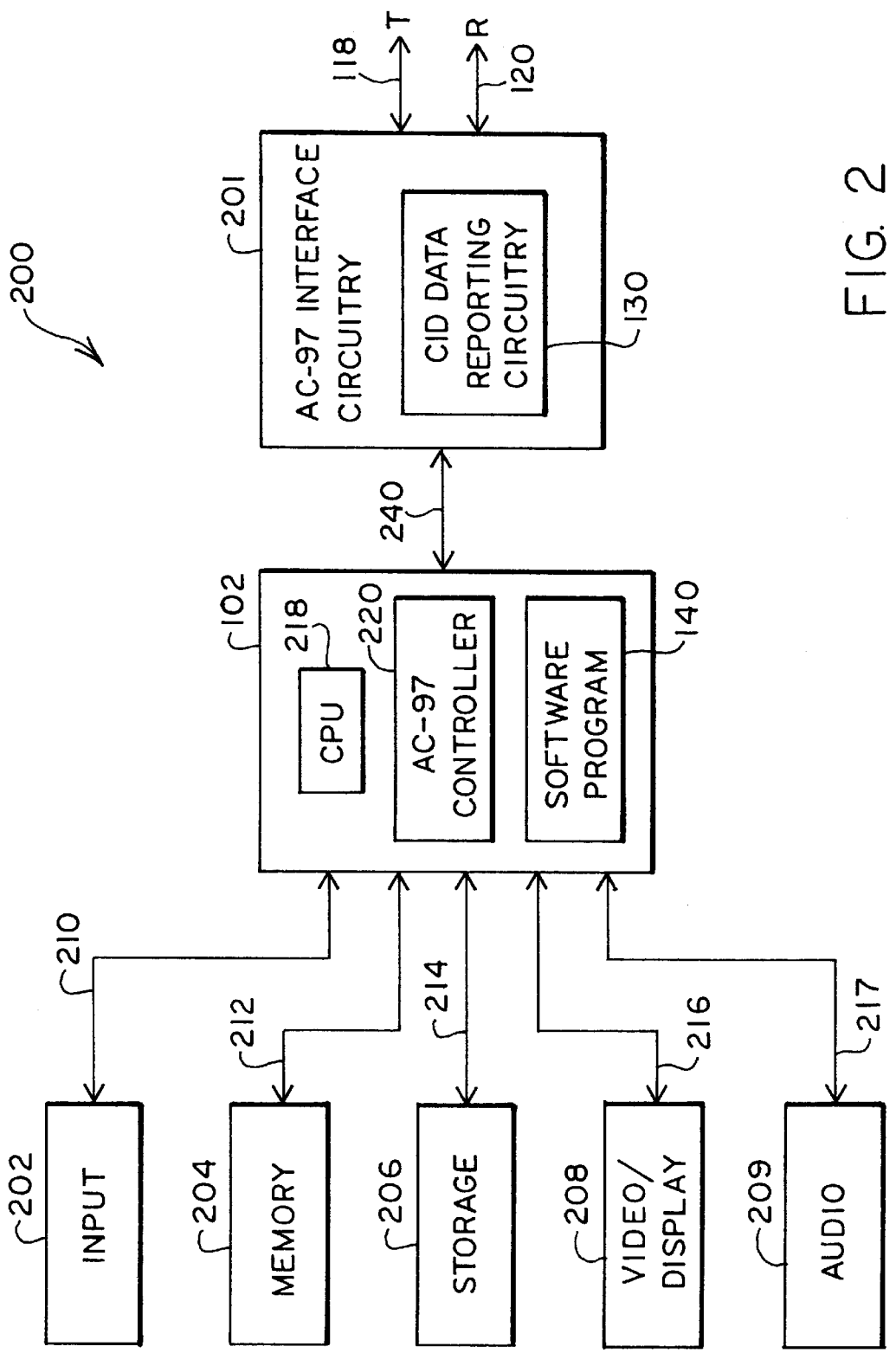
FIG. 2 shows a block diagram of a computer system that comprises an AC-97 controller and a line-interface controller that includes CID data-reporting circuitry according to the invention.

The present invention proves particularly useful where the host processor 102 at least in part comprises a controller configured to operate within the AC-97 operational specifications, and the circuitry interfacing with the telephone line also operates within the AC-97 operational specifications. FIG. 2 shows a block diagram of an embodiment directed to an AC-97 application. An embodiment 200 according to the invention includes a central processing unit (CPU) 218. The CPU 218 may couple to one or more other devices through interfaces or buses 210, 212, 214, 216, and 217. As persons skilled in the art will appreciate, a single bus or interface may couple the CPU 218 to various devices in the computer system 200. For example, the CPU 218 may couple to one or more input devices 202, memory devices 204, storage devices 206, video/display devices 208, and audio devices 209.

Furthermore, the CPU 218 may couple to an AC-97 controller 220 configured to operate within the AC-97 operational specifications. The AC-97 controller may reside within a separate block, as shown as in FIG. 2. Alternatively, the AC-97 controller 220 or its functionality may reside in any other suitable location, including within the CPU 218. The CPU 218 and the AC-97 controller 220 may, together or individually, form the host processor 102 in FIG. 1, as desired. The software program 140 may run on the CPU 218, the AC-97 controller 220, or both, depending on the particular application.

The AC-97 controller 220 couples to AC-97 interface circuitry 201 through an interface 240. The signal lines forming the interface 240 may be a subset or all of the signal lines forming the interface 110 shown in FIG. 1. Similar to the AC-97 controller 220, the AC-97 interface circuitry 201 also operates within the AC-97 operational specifications. The AC-97 controller 220 allows the host processor 102 to communicate with tip (T) 118 and ring (R) 120 of a telephone line. According to the present invention, the AC-97 interface circuitry 201 may include at least one CID data-reporting circuitry 130. The CID data-reporting circuitry 130 provides CID data to the host processor 102 through the interface 240. The software program 140 operates in conjunction with the CID data-reporting circuitry 130, as described above. The software program 140 receives CID data from the AC-97 controller 220 through interface 240. Alternatively, the software program 140 may receive CID data from the CPU 218 or one or more of the devices 202, 204, 206, 208, and 209. As noted above, the CID data-reporting circuitry 130 according to this invention accesses the CID data through the AC-97 status and control channel, i.e., time-slots 1 and 2 of the AC-97 data frame. The CID data-reporting circuitry 130 reports the CID data asynchronously, i.e., in non-pre-determined intervals. Thus, the CID data-reporting circuitry 130 places no real-time constraints on the software program 140.

Figure 3:
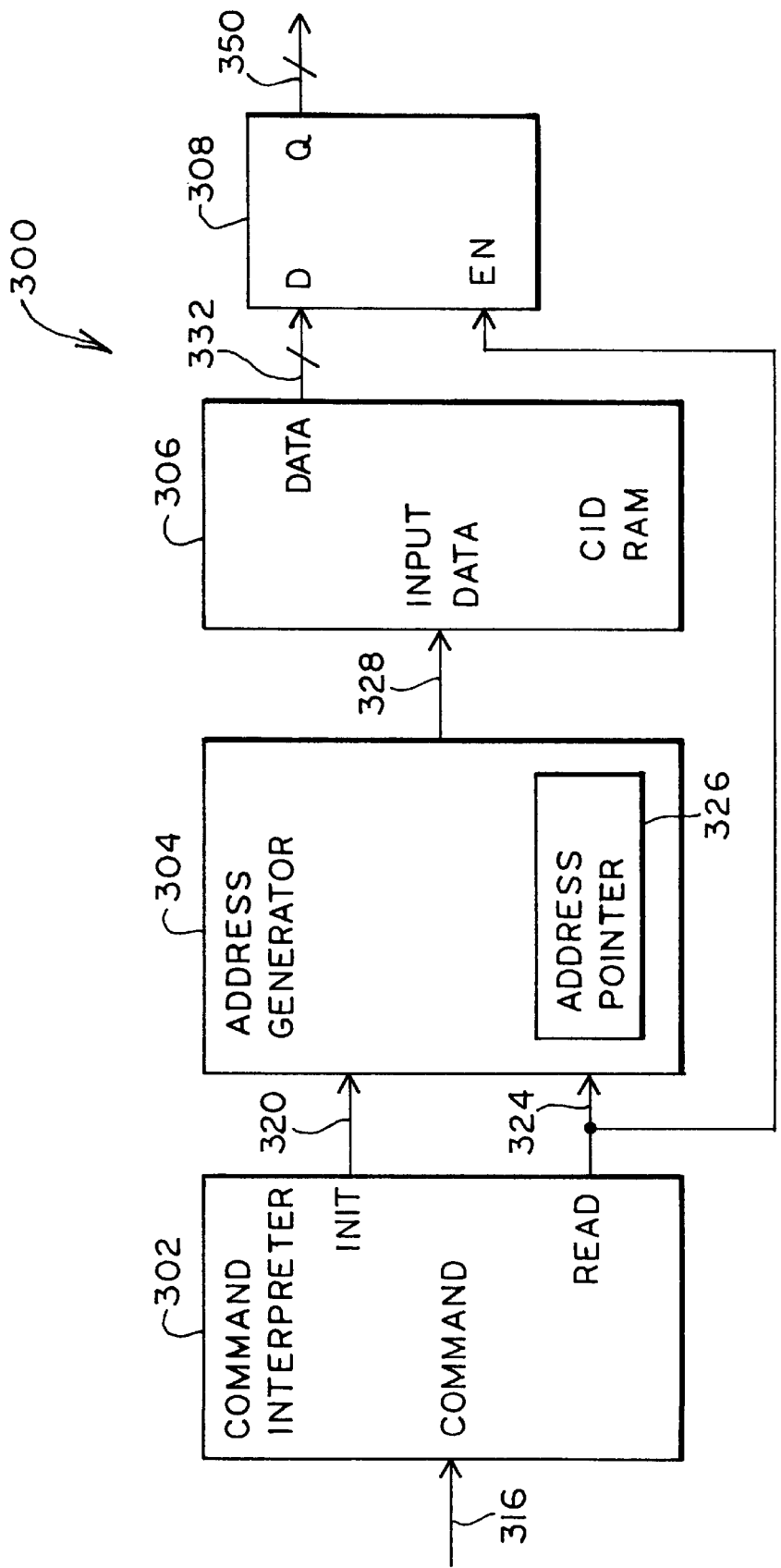
FIG. 3 illustrates a more detailed embodiment of the CID data-reporting circuitry according to the invention for providing CID data to a host computer or controller that operates within the AC-97 operational requirements.

FIG. 3 illustrates a more detailed block diagram of an embodiment 300 of CID data-reporting circuitry according to the invention. The CID data-reporting circuitry in FIG. 3 comprises a command interpreter 302, an address generator 304, CID random-access memory (RAM) 306, and an output register 308. The CID data-reporting circuitry operates as follows: The command interpreter 302 has a command input 316. The command interpreter 302 receives a command from a software program, e.g., the software program 140 in FIG. 1 or FIG. 2, through its command input 316. Referring back to FIG. 3, upon receiving the command, the command interpreter 302 decodes it to determine the operations it must undertake in response to the command. Note that the command interpreter may receive and interpret commands other than those relating to the reporting of CID data.

The command interpreter 302 also includes an initialize output 320 and a read output 324. As described below, the read output 324 facilitates reading of CID data and reporting the data to a host processor or controller, as shown in FIG. 1 or FIG. 2. The initialize output 320 causes the address generator 304 to initialize an address pointer 326 to a known value, typically the starting address of the CID data residing within the CID RAM 306. As noted above, the CID data-reporting mechanism according to this invention uses the AC-97 status and control channel, i.e., AC-97 time-slots 1 and 2. The command interpreter 302 provides its initialize output 320 and its read output 324 by decoding time-slots 0, 1, and 2 of the AC-97 data frames. Time-slot 0 determines which other time-slots contain valid data. Time-slots 1 and 2 constitute status and control channels.

In a preferred embodiment of the invention, writing to the registers in the AC-97 address space controls the operation of the CID data-reporting circuitry. Specifically, writing to register 74 hexadecimal causes the command interpreter 302 to provide the initialize output 320 to the address generator 304. Reading register 74 hexadecimal causes the command interpreter 302 to provide the read output 324 to the address generator 304 and to the output register 308. The initialize output 320 and the read output 324 control the operation of the address generator 304, the CID RAM 306, and the output register 308.

The address generator 304 provides the value of the address pointer 326 to the CID RAM 306 through the address output 328 of the address generator 304. In response, the CID RAM 306 reads the data word residing at the address specified by the address output 328 and makes the data word available at a data output 332 of the CID RAM 306. The data output 332 of the CID RAM 306 typically is one word wide and drives data inputs of the output register 308. Output lines 350 of the output register 308 provide the CID data to follow-on circuitry, for example, one of more of a DAA circuitry, a host processor, or a controller, which preferably operates within the AC-97 operational specifications.

The read output 324 of the command interpreter 302 serves a dual purpose in the embodiment shown in FIG. 3. The read output 324 enables the output lines 350 of the output register 308 and makes the CID data available at the output lines 350, as described above. The read output 324 of the command interpreter 302 also causes the address generator 304 to increment the address pointer 326, thus preparing the address generator 304 for another data-read cycle. Put another way, the read output 324 causes the post-incrementing of the address pointer 326. Alternatively, one may alter the circuitry in FIG. 3 so that the read output 324 pre-increments the address pointer 326. Such an alteration is routine and within the knowledge of a person skilled in the art.

Although the circuitry shown in FIG. 3 shows separate blocks for the command interpreter 302, the address generator 304, the CID RAM 306, and the output register 308, persons skilled in the art will recognize that one may employ other circuit arrangements to accomplish the same overall function. For example, the CID RAM 306 may include the functions of the address generator 304. Likewise, the CID RAM 306 may incorporate the functions of the output register 308. Alternatively, the command interpreter 302 may include the functions of the address generator 304. These alternative arrangements accomplish the same overall functions as the embodiment 300 described in detail above.

One aspect of the invention contemplates incorporating the functions of the command interpreter 302, the address generator 304, the CID RAM 306, and the output register 308 in a single integrated circuit device. Persons skilled in the art, however, will recognize that one may include one or more of the above circuits in separate discrete circuitry, modules, integrated circuits, or combinations of those devices. Moreover, one may group some of the functions in one integrated circuit device and group the remaining functions in one or more integrated circuit devices. For example, one integrated circuit device may include the command interpreter 302 and the address generator 304 and a second integrated circuit device may include the CID RAM 306 and the output register 308, as desired.

In the embodiment 300 shown in FIG. 3, the address pointer 326 and the address output 328 each comprise 6 bits. Furthermore, the data output 332 of the CID RAM 306 and the data output 350 of the output register 308 each comprise 16 bits. A person skilled in the art, however, will appreciate that one may readily use other data- and address-word widths by varying the circuit (e.g., by adding or removing elements or by changing the number of the input lines, the number of the output lines, or both).

Further modifications and alternative embodiments of this invention will be apparent to those skilled in the art in view of this description of the invention. Accordingly, this description teaches those skilled in the art the manner of carrying out the invention and are to be construed as illustrative only. The forms of the invention shown and described constitute the presently preferred embodiments. Persons skilled in the art may make various changes in the shape, size and arrangement of parts. For example, persons skilled in the art may substitute equivalent elements for the elements illustrated and described here. Moreover, persons skilled in the art after having the benefit of this description of the invention may use certain features of the invention independently of the use of other features, without departing from the scope of the invention.

I claim:

1. Direct-access-arrangement (DAA) circuitry configured to operate within the AC-97 operational specifications, comprising:

interface circuitry configured to receive input data and to provide output data, the interface circuitry further configured to operate within the AC-97 operational specifications; and Caller ID data-reporting circuitry coupled to the interface circuitry, the Caller ID data-reporting circuitry configured to provide Caller ID data to the interface circuitry asynchronously in one-word increments at non-pre-determined intervals.

2. Direct-access-arrangement circuitry according to claim 1, in which the interface circuitry resides within an integrated circuit device.

3. Direct-access-arrangement circuitry according to claim 2, in which the Caller ID data-reporting circuitry resides within the integrated circuit device.

4. Direct-access-arrangement circuitry according to claim 1, in which the Caller ID data-reporting circuitry further comprises:

an output register configured to receive input data and to provide output data to the interface circuitry; and a random-access memory having a plurality of address input lines and a plurality of data output lines, the random-access memory configured to store and provide Caller ID data, the data output lines of the random-access memory configured to provide Caller ID data to the output register.

5. Direct-access-arrangement circuitry according to claim 4, in which the Caller ID data-reporting circuitry further comprises:

an address generator having an initialization input, and a plurality of address lines coupled to the address input lines of the random-access memory, the address generator configured to initialize its address lines in response to an initialization signal provided to the initialization input; and a command interpreter coupled to the address generator, the command interpreter configured to accept a command, decode the command, and provide an initialization signal and an increment control signal to the address generator.

6. An integrated circuit device configured to operate within the AC-97 operational specifications, comprising:

interface circuitry within the integrated circuit device configured to receive input data and to provide output data, the interface circuitry further configured to operate within the AC-97 operational specifications; and Caller ID data-reporting circuitry within the integrated circuit device, the Caller ID data-reporting circuitry coupled to the interface circuitry, the Caller ID data-reporting circuitry configured to provide Caller ID data to the interface circuitry asynchronously in one-word increments at non-pre-determined intervals.

7. The integrated circuit device according to claim 6, in which the Caller ID data-reporting circuitry further comprises:

an output register configured to receive input data and to provide output data to the interface circuitry; and a random-access memory having a plurality of address input lines and a plurality of data output lines, the random-access memory configured to store and provide Caller ID data, the data output lines of the random-access memory configured to provide Caller ID data to the output register.

8. The integrated circuit device according to claim 7, in which the Caller ID data-reporting circuitry further comprises:

an address generator having an initialization input, and a plurality of address lines coupled to the address input lines of the random-access memory, the address generator configured to initialize its address lines in response to an initialization signal provided to the initialization input; and a command interpreter coupled to the address generator, the command interpreter configured to accept a command, decode the command, and provide an initialization signal and an increment control signal to the address generator.

9. A device configured to operate within the AC-97 operational specifications, comprising:

means for interfacing to an AC-97 compliant device configured to receive input data and to provide output data, the means for interfacing to an AC-97 compliant device further configured to operate within the AC-97 operational specifications; and means for reporting Caller ID data, the means for reporting Caller ID data coupled to the means for interfacing to an AC-97 compliant device, the means for reporting Caller ID data configured to provide Caller ID data to the means for interfacing to an AC-97 compliant device asynchronously in one-word increments at non-pre-determined intervals.

10. The device according to claim 9, in which the means for interfacing to an AC-97 compliant device resides within an integrated circuit device.

11. The device according to claim 10, in which the means for reporting Caller ID data resides within the integrated circuit.

12. The device according to claim 9, in which the means for reporting Caller ID data further comprises:

means for registering data, configured to receive input data and to provide output data to the means for interfacing to an AC-97 compliant device; and means for storing Caller ID data, the means for storing Caller ID data having a plurality of address input lines and a plurality of data output lines, the means for storing Caller ID data configured to store and provide Caller ID data to the means for registering data.

13. The device according to claim 12, in which the means for reporting Caller ID data further comprises:

means for generating addresses, the means for generating addresses having an initialization input and a plurality of address lines coupled to the address input lines of the means for storing Caller ID data, the means for generating addresses configured to initialize its address lines in response to an initialization signal provided to the initialization input; and means for interpreting commands, coupled to the means for generating addresses, the means for interpreting commands configured to accept a command, decode the command, and provide an initialization signal and an increment control signal to the means for generating addresses.

14. A computer system having direct-access-arrangement (DAA) circuitry configured to couple the computer system to data lines, comprising:

a processor configured to process data and to decode and process instructions;

a controller coupled to the processor, the controller configured to operate within the AC-97 operational specifications;

direct-access-arrangement circuitry coupled to the controller and configured to operate within the AC-97 operational specifications, the direct-access-arrangement circuitry further configured to provide data to the controller and to receive data from the controller; and Caller ID data-reporting circuitry coupled to the direct-access-arrangement circuitry, the Caller ID data-reporting circuitry configured to provide Caller ID data to the direct-access-arrangement circuitry asynchronously in one-word increments at non-pre-determined intervals.

15. The computer system according to claim 14, in which the interface circuitry resides within an integrated circuit device.

16. The computer system according to claim 15, in which the Caller ID data-reporting circuitry resides within the integrated circuit device.

17. The computer system according to claim 14, in which the Caller ID data-reporting circuitry further comprises:

an output register configured to receive input data and to provide output data to the direct-access-arrangement circuitry; and a random-access memory having a plurality of address input lines and a plurality of data output lines, the random-access memory configured to store and provide Caller ID data, the data output lines of the random-access memory configured to provide Caller ID data to the output register.

18. The computer system according to claim 17, in which the Caller ID data-reporting circuitry further comprises:

an address generator having an initialization input, and a plurality of address lines coupled to the address input lines of the random-access memory, the address generator configured to initialize its address lines in response to an initialization signal provided to the initialization input; and a command interpreter coupled to the address generator, the command interpreter configured to accept a command, decode the command, and provide an initialization signal and an increment control signal to the address generator.

19. A computer system including circuitry configured to operate within the AC-97 operational specifications, comprising:

a controller configured to operate within the AC-97 operational specifications;

an integrated circuit device, coupled to the controller, and configured to operate within the AC-97 operational specifications, the integrated circuit device further configured to provide data to the controller; and Caller ID data-reporting circuitry included within the integrated circuit device, the Caller ID data-reporting circuitry configured to receive Caller ID data and to provide Caller ID data to the controller asynchronously in one-word increments at non-pre-determined intervals.

20. The computer system according to claim 19, in which the Caller ID data-reporting circuitry further comprises:

an output register configured to receive Caller ID data and to provide Caller ID data; and a random-access memory having a plurality of address input lines and a plurality of data output lines, the random-access memory configured to store and provide Caller ID data, the data output lines of the random-access memory configured to provide Caller ID data to the output register.

21. The computer system according to claim 20, in which the Caller ID data-reporting circuitry further comprises:

an address generator having an initialization input, and a plurality of address lines coupled to the address input lines of the random-access memory, the address generator configured to initialize its address lines in response to an initialization signal provided to the initialization input; and a command interpreter coupled to the address generator, the command interpreter configured to accept a command, decode the command, and provide an initialization signal and an increment control signal to the address generator.

22. A method for reporting Caller ID data in a computer system, comprising:

providing a host processor configured to process data and to decode and process instructions;

providing direct-access-arrangement (DAA) circuitry configured to operate within the AC-97 operational specifications, the direct-access-arrangement circuitry including Caller ID data-reporting circuitry configured to provide Caller ID data asynchronously in one-word increments at non-pre-determined intervals;

receiving Caller ID data in the Caller ID data-reporting circuitry; and providing the Caller ID data to the host processor.

23. The method according to claim 22, in which the direct-access-arrangement circuitry in the step of providing the host-side direct-access-arrangement circuitry resides in an integrated circuit device.

24. The method according to claim 22, in which the step of providing the host-side direct-access-arrangement circuitry further comprises:

providing an output register configured to receive Caller ID data and to provide Caller ID data; and providing a random-access memory within the Caller ID data-reporting circuitry, the random-access memory configured to receive an address and to provide Caller ID data stored at the address to the output register.

25. The method according to claim 24, in which the step of providing the host-side direct-access-arrangement circuitry further comprises:

providing an address generator within the Caller ID data-reporting circuitry, the address generator configured to provide an address to the random-access memory in response to an initialization signal; and providing a command interpreter within the Caller ID data-reporting circuitry, the command interpreter configured to receive an input command, decode the input command, and provide an initialization signal and an increment control signal to the address generator.

26. A method for reporting Caller ID data, comprising:

providing direct-access-arrangement (DAA) circuitry configured to operate within the AC-97 operational specifications, the direct-access-arrangement circuitry including Caller ID data-reporting circuitry, the Caller ID data-reporting circuitry configured to receive Caller ID data and to provide Caller ID data asynchronously in one-word increments at non-pre-determined intervals;

receiving Caller ID data in the Caller-ID data-reporting circuitry; and providing the Caller ID data to a device.

27. The method according to claim 26, in which the direct-access-arrangement circuitry in the step of providing the host-side direct-access-arrangement circuitry resides in an integrated circuit device.

28. The method according to claim 26, in which the step of providing the host-side direct-access-arrangement circuitry further comprises:

providing an output register configured to receive Caller ID data and to provide Caller ID data; and providing a random-access memory within the Caller ID data-reporting circuitry, the random-access memory configured to receive an address and to provide Caller ID data stored at the address to the output register.

29. The method according to claim 28, in which the step of providing the host-side direct-access-arrangement circuitry further comprises:

providing an address generator within the Caller ID data-reporting circuitry, the address generator configured to provide an address to the random-access memory in response to an initialization signal; and providing a command interpreter within the Caller ID data-reporting circuitry, the command interpreter configured to receive an input command, decode the input command, and provide an initialization signal and an increment control signal to the address generator.

30. The method according to claim 29, in which the device in the step of providing the Caller ID data comprises a host processor.

31. The method according to claim 29, in which the device in the step of providing the Caller ID data comprises a controller configured to operate within the AC-97 operational specifications.

* * * * *